W. T. Nichols.
Hay-Stacker.
Nº 73748.  Patented Jan. 28, 1868.
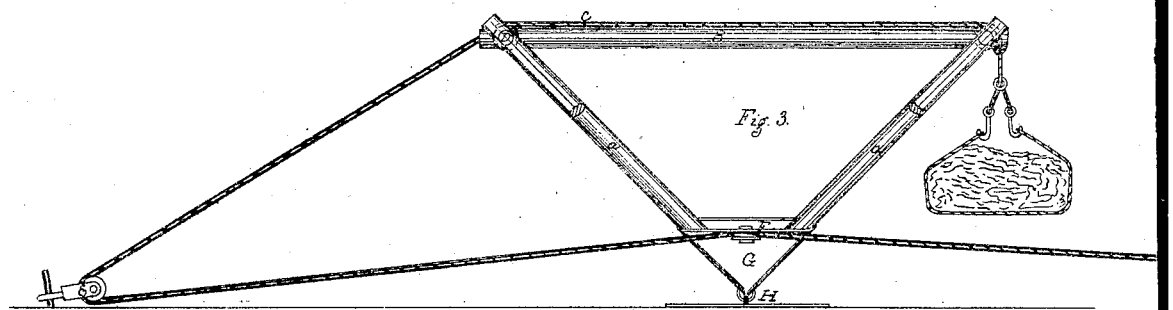
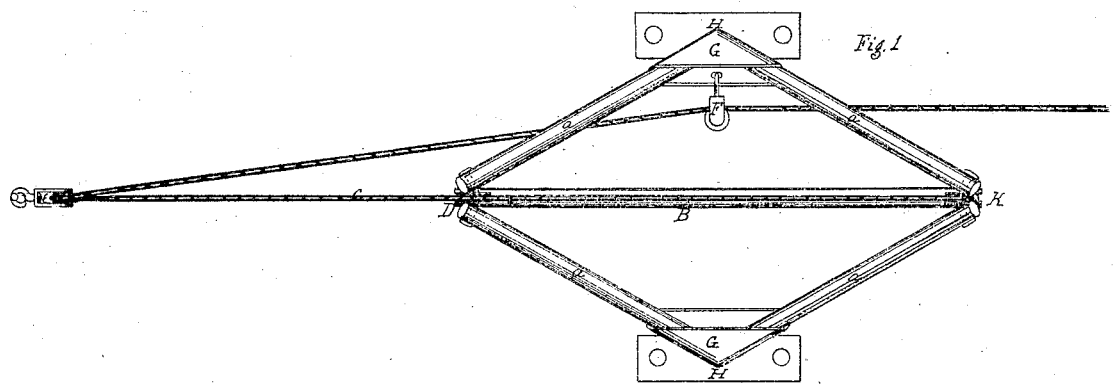
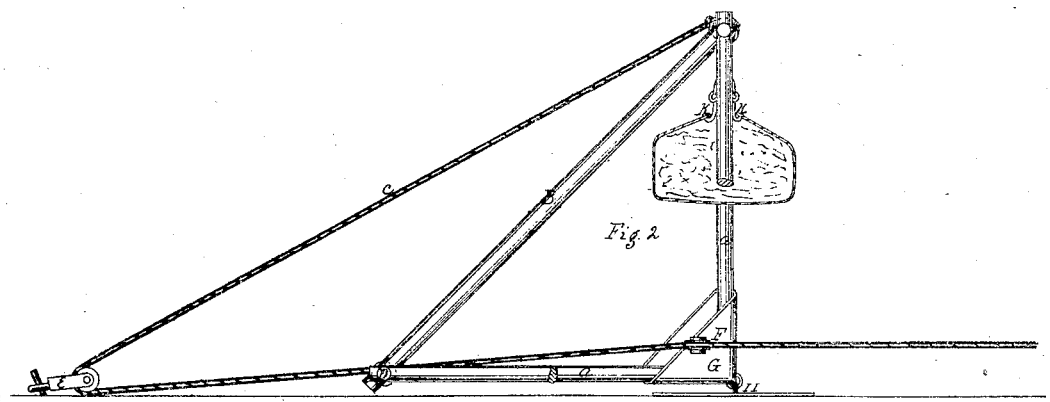
Witnesses
Inventor
W. T. Nichols

United States Patent Office.

W. T. NICHOLS, OF RUTLAND, VERMONT.

Letters Patent No. 73,748, dated January 28, 1868.

---

IMPROVEMENT IN HAY-STACKERS.

---

The Schedule referred to in these Letters Patent and making part of the same.

---

Be it known that I, W. T. NICHOLS, of Rutland, in the county of Rutland, and State of Vermont, have invented a new and useful machine for hoisting and placing in position hay, grain, or other materials, but mainly intended to be used for the purpose of unloading hay by horse-power, which, to give it a distinctive name, I denominate a Hay-Stacker; and I do hereby declare that the following is a full, clear, and exact description of the construction and operation of the same, reference being had to the annexed drawing.

Figure 1, top view.

Figures 2 and 3, side view.

A, legs of the shears; B, lever-beam; C, rope; D, pulley; E, lifting-pulley; F, draught-pulley; G, sockets; H, pivoted fulcrum; K, engaging-hooks.

The design is to unload hay, but the shears may be used for loading and unloading from vessels, platform-cars, common wagons, and hoisting purposes generally, without herein enumerating them.

It is constructed of timber, of any desired strength, size, and length, and with four or more legs, radiating from the pivoted fulcrum H to the lever-beam B in one direction, and from the lever-beam B to the pivots H in the other direction. The angle from the pivots, or from the beam, can be adjusted to suit the purposes to be accomplished, the whole being securely fastened by bolts or otherwise. The rope C is attached at the end of the beam B, passing along the entire length of the beam upon the top, thence down through the pulley D, thence around the lifting-pulley E, thence through the draught-pulley F, thence to the team. The machine is lowered, so that the engaging-hooks can grapple the load, and when grappled the power is applied, whereupon the shears or machine revolves upon the fulcrum at the pivots H, lifting the load and carrying it in a backward direction at the same time, the rope C operating over the pulley D till that point becomes the shortest lever, when the draught comes upon the point K, and the machine is then reversed in its position upon the ground, the load being held in the upper part of the triangle, A K A, directly over a line drawn from H to H, and can be dropped by either turning the engaging-hooks or loosening the rope. The machine is so simple, and of so few parts, that it will be comprehended from the drawings.

I claim a hoisting-machine, for unloading hay or other purposes, composed of a lever-beam B, attached to four or more legs A, revolving upon fulcra H H, operated by rope C, or their equivalent, substantially as set forth and described.

W. T. NICHOLS.

Witnesses:
 EDM. F. BROWN,
 A. M. STOUT.